(12) United States Patent
Wu et al.

(10) Patent No.: US 9,378,513 B2
(45) Date of Patent: Jun. 28, 2016

(54) ELECTRONIC SHELF LABEL CONTROLLING SYSTEM, ELECTRONIC SHELF LABEL INSTALLING METHOD AND ELECTRONIC SHELF LABEL UPDATING METHOD

(71) Applicant: INDUSTRIAL TECHNOLOGY RESEARCH INSTITUTE, Hsinchu (TW)

(72) Inventors: Chun-Hsien Wu, Taichung (TW);
Ching-Ying Lai, Taichung (TW);
Chun-Hao Peng, Hsinchu (TW);
Yueh-Feng Lee, Taipei (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 66 days.

(21) Appl. No.: 14/333,941

(22) Filed: Jul. 17, 2014

(65) Prior Publication Data
US 2015/0178767 A1    Jun. 25, 2015

(30) Foreign Application Priority Data
Dec. 23, 2013   (TW) .............................. 102147781 A

(51) Int. Cl.
*G06F 3/147*    (2006.01)
*G06Q 30/02*    (2012.01)

(52) U.S. Cl.
CPC ............ *G06Q 30/0241* (2013.01); *G06F 3/147* (2013.01); *G09G 2360/04* (2013.01); *G09G 2370/022* (2013.01); *G09G 2370/16* (2013.01); *G09G 2380/04* (2013.01)

(58) Field of Classification Search
CPC .......... G09G 2380/04; G09G 2370/16; G06Q 10/087; G06Q 30/0241; G06F 3/147
See application file for complete search history.

(56) References Cited

U.S. PATENT DOCUMENTS 5,241,467 A * 8/1993 Failing .................. G06Q 10/02
                                                  235/383
5,448,226 A * 9/1995 Failing, Jr. ......... G06K 17/0022
                                                  235/383

(Continued)

FOREIGN PATENT DOCUMENTS

CN    101611431 A    12/2009
CN    102938082 A    2/2013

(Continued)

OTHER PUBLICATIONS

Taiwanese Office Action dated Jul. 15, 2015.

(Continued)

*Primary Examiner* — Andrew Bee
(74) *Attorney, Agent, or Firm* — Rabin & Berdo, P.C.

(57) ABSTRACT

An electronic shelf label controlling system, an electronic shelf label installing method and an electronic shelf label updating method are provided. The electronic shelf label controlling system of the electronic shelf label includes at least an electronic shelf label, a controlling device, a deploying device, and a communication gateway device. The electronic shelf label is disposed on a shelf. The controlling device stores a label location table. The label location table records a relationship between a label identifying information and a label location information of the electronic shelf label. The deploying device is used for obtaining the label identifying information. The communication gateway device is used for communicating the controlling device, the deploying device and the electronic shelf label.

12 Claims, 14 Drawing Sheets

(56) References Cited

U.S. PATENT DOCUMENTS

| | | | |
|---|---|---|---|
| 5,473,146 | A | 12/1995 | Goodwin, III |
| 5,537,312 | A | 7/1996 | Sekiguchi et al. |
| 5,704,049 | A * | 12/1997 | Briechle ............... G06F 3/147 235/383 |
| 5,818,346 | A * | 10/1998 | Goodwin, III ......... G06Q 30/02 340/5.91 |
| 6,105,004 | A | 8/2000 | Halperin et al. |
| 6,269,342 | B1 | 7/2001 | Brick et al. |
| 6,271,807 | B1 | 8/2001 | Kayser et al. |
| 6,552,663 | B2 | 4/2003 | Swartzel et al. |
| 8,009,348 | B2 * | 8/2011 | Zehner .................. G06Q 30/00 359/290 |
| 8,061,601 | B1 | 11/2011 | Harkins et al. |
| 8,210,430 | B1 | 7/2012 | Grant et al. |
| 2007/0159298 | A1 * | 7/2007 | Zegelin ............. G06K 17/0022 340/5.91 |
| 2008/0052198 | A1 * | 2/2008 | Hosokawa ........... G06Q 10/087 705/28 |
| 2008/0255894 | A1 | 10/2008 | Falls et al. |
| 2010/0138322 | A1 * | 6/2010 | Nakamura ........... G06Q 10/087 705/28 |
| 2011/0025461 | A1 | 2/2011 | Nobutsugu et al. |
| 2011/0102144 | A1 * | 5/2011 | Okina ................... G06Q 30/02 340/5.91 |
| 2011/0240731 | A1 | 10/2011 | Lee et al. |
| 2012/0044056 | A1 | 2/2012 | Byun et al. |
| 2012/0055985 | A1 | 3/2012 | Allen |
| 2012/0161943 | A1 | 6/2012 | Byun et al. |

FOREIGN PATENT DOCUMENTS

| | | |
|---|---|---|
| TW | 201322116 A | 6/2013 |
| TW | 201322165 A | 6/2013 |
| WO | WO 2010-137883 A2 | 12/2010 |

OTHER PUBLICATIONS

Yulia Ponomarchuk et al., "A Lightweight and Effective Jamming Detection in Electronic Shelf Label Systems" 2009 Proceedings of the 4th International Conference on Ubiquitous Information Technologies & Applications, pp. 1-6, Dec. 2009.

James G. Evans et al., "A Low-Cost Radio for an Electronic Price Label System" Bell Labs Technical Journal, vol. 1, Issue 2, pp. 203-215, Autumn 1996.

James G. Evans et al., "A Low-Cost Two-Way Radio Transceiver" 1998 URSI International Symposium on Signals, Systems, and Electronics, pp. 301-303, Sep. 1998.

Bong Wan Kim et al., "A New Commissioning and Deployment Method for Wireless Sensor Networks" 2009 Third International Conference on Mobile Ubiquitous Computing, Systems, Services and Technologies, pp. 232-237, Oct. 2009.

Pieter De Mil et al., "Design and Implementation of a Generic Energy-Harvesting Framework Applied to the Evaluation of a Large-Scale Electronic Shelf-Labeling Wireless Sensor Network" EURASIP Journal on Wireless Communications and Networking—Special issue on design, implementation, and evaluation of wireless sensor network systems, vol. 2010, Article No. 7, Feb. 2010.

Hong Hong et al., "Electronic Shelf Label System Based on Public Illuminating Network" 2008 IEEE Asia Pacific Conference on Circuits and Systems, pp. 1103-1106, Nov. 2008.

* cited by examiner

ELECTRONIC SHELF LABEL CONTROLLING SYSTEM, ELECTRONIC SHELF LABEL INSTALLING METHOD AND ELECTRONIC SHELF LABEL UPDATING METHOD

CROSS-REFERENCE TO RELATED APPLICATION

This application claims the benefit of Taiwan application Serial No. 102147781, filed Dec. 23, 2013, the disclosure of which is incorporated by reference herein in its entirety.

TECHNICAL FIELD

The disclosure relates in general to an electronic shelf label controlling system, an electronic shelf label installing method and an electronic shelf label updating method.

BACKGROUND

As the business development, varied products are provided for consumers to choose. While the products are arranged on a shelf, shelf labels can be used for informing the consumers the name, the price or the promotion of the products.

In conventional, since the shelf labels are made of printed papers and stuck on the shelf, it is time-consuming to use those shelf labels. Further, since the shelf labels cannot be reused, it is waste to use those papers.

Electronic shelf labels can display the product information in digital and can be reused without printing any paper. Therefore, it is a future trend to use the electronic shelf labels instead of the conventional shelf labels.

SUMMARY

The disclosure is directed to an electronic shelf label controlling system, an electronic shelf label installing method and an electronic shelf label updating method.

According to one embodiment, an electronic shelf label controlling system is provided. The electronic shelf label controlling system comprises at least an electronic shelf label, a controlling device, a deploying device and a communication gateway device. The electronic shelf label is disposed on a shelf. The controlling device stores a label location table. The label location table records a relationship between a label identifying information and a label location information of the electronic shelf label. The deploying device is used for obtaining the label identifying information. The communication gateway device is used for communicating the controlling device, the deploying device and the electronic shelf label.

According to one embodiment, an electronic shelf label installing method is provided. The electronic shelf label installing method comprises the following steps. A label identifying information of a first electronic shelf label is obtained. A label location information is obtained according to a location of the first electronic shelf label on a shelf. A relationship between the label identifying information and the label location information is created. A label location table is changed according to the relationship between the label identifying information and the label location information.

According to one embodiment, an electronic shelf label updating method is provided. A label content table records a relationship between a first label location information and a first label displaying information of a first electronic shelf label. A label location table records a first label identifying information and the first label location information of the first electronic shelf label. The electronic shelf label updating method includes the following steps. The label content table is changed. Whether a second electronic shelf label is needed to be installed, or the first electronic shelf label is needed to be removed according to the changed label content table is determined. The first label location information is obtained according to the changed label content table, if the second electronic shelf label is not needed to be installed, and the first electronic shelf label is not needed to be removed. The first label identifying information corresponding to the first label location information is obtained according to the label location table. The changed first label displaying information is transmitted to the first electronic shelf label.

Figure 1:
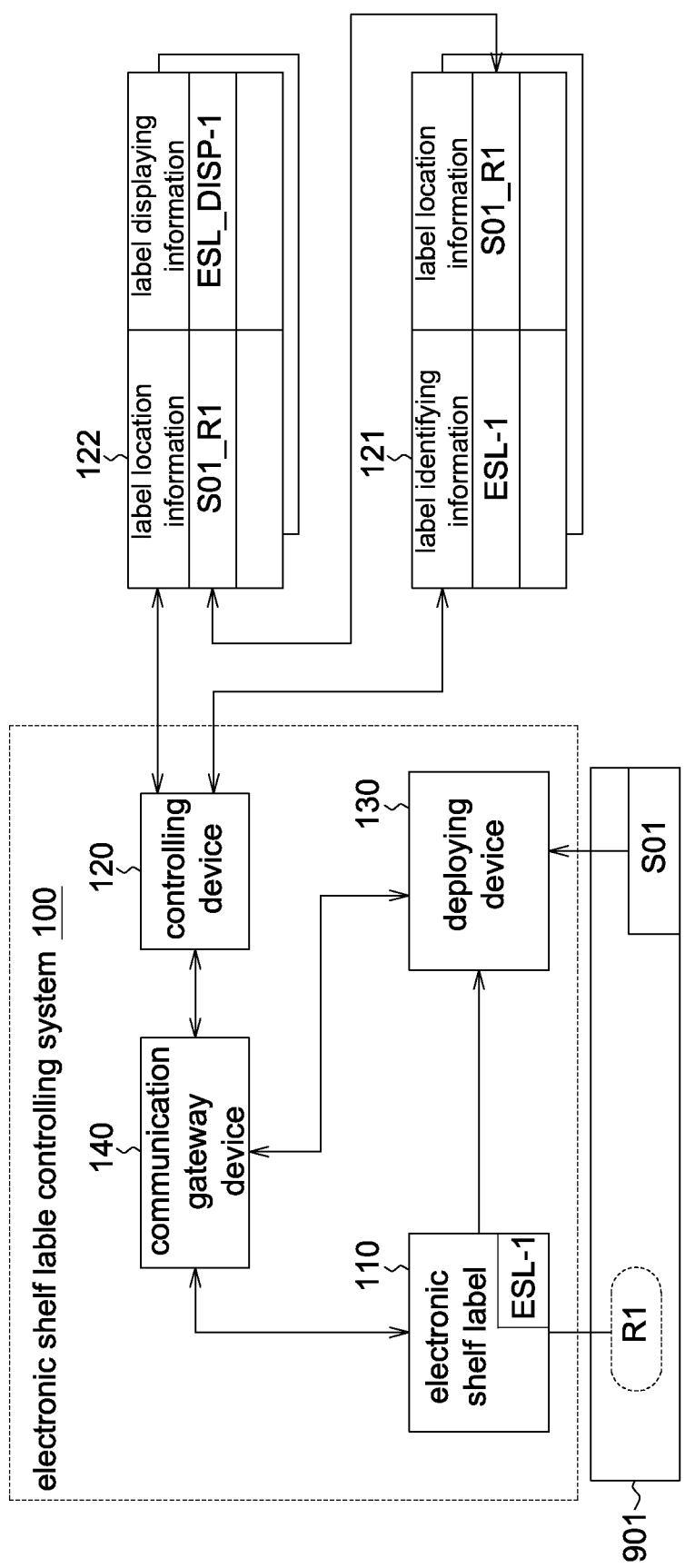
FIG. 1 shows an electronic shelf label controlling system.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Please referring to FIG. 1, an electronic shelf label controlling system 100 is shown. The electronic shelf label controlling system 100 includes at least one electronic shelf label 110, a controlling device 120, a deploying device 130 and a communication gateway device 140.

The electronic shelf label 110 is disposed on a shelf 901, for displaying varied product information, such as the name, the price, a barcode, a promotion information, or a product transferring instruction for placing the product on the shelf or removing the product from the shelf. For example, the electronic shelf label 110 may be a liquid crystal display, an organic light-emitting diodes display or an electronic paper display.

The controlling device 120 is used for storing varied tables and performing varied controlling procedures. For example, the controlling device 120 may be a network server, a desktops computer or a notebook computer. The communication gateway device 140 is used for communicating the controlling device 120 and the deploying device 130. In other embodiment, the communication gateway device 140 can be connected to the electronic shelf label 110 via wireless or cable for communication.

The communication gateway device 140 is used for transmitting varied information. For example, the communication gateway device 140 may be a wired network system or a wireless transmission system.

The deploying device 130 is used for reading the information of the shelf 901 or the electronic shelf label 110. For example, the deploying device 130 may be a smart phone, a tablet PC or a handheld device. The information read from the deploying device 130 is transmitted to the controlling device 120 by the communication gateway device 140.

The controlling device 120 stores a label location table 121 and a label content table 122. The label location table 121 records a label identifying information and a label location information of the electronic shelf label 110. The label content table 122 records the label location information and a label displaying information of the electronic shelf label 110. The label identifying information is used for identifying the electronic shelf label 110, such as "ESL-1." The label location information is used for recording the shelf 901 where the electronic shelf label 110 is disposed and the relative position on the shelf 901 where the electronic shelf label 110 is disposed, such as "S01_R1." "S01" is a shelf code and "R1" is a location code. The label displaying information is a product relating information and a product transferring instruction, such as "place or remove." For example, the label displaying information may be "ESL_DISP-1."

The manager can change the label content table 122 by the controlling device 120, and then transmit the label displaying information to the electronic shelf label 110 according to the label location table 121.

In one embodiment, a relationship between the label identifying information and the label location information can be created by the controlling device 120 (hereinafter a first architecture). In another embodiment, the relationship between the label identifying information and the label location information can be created by the deploying device 130 (hereinafter a second architecture).

Figure 2:
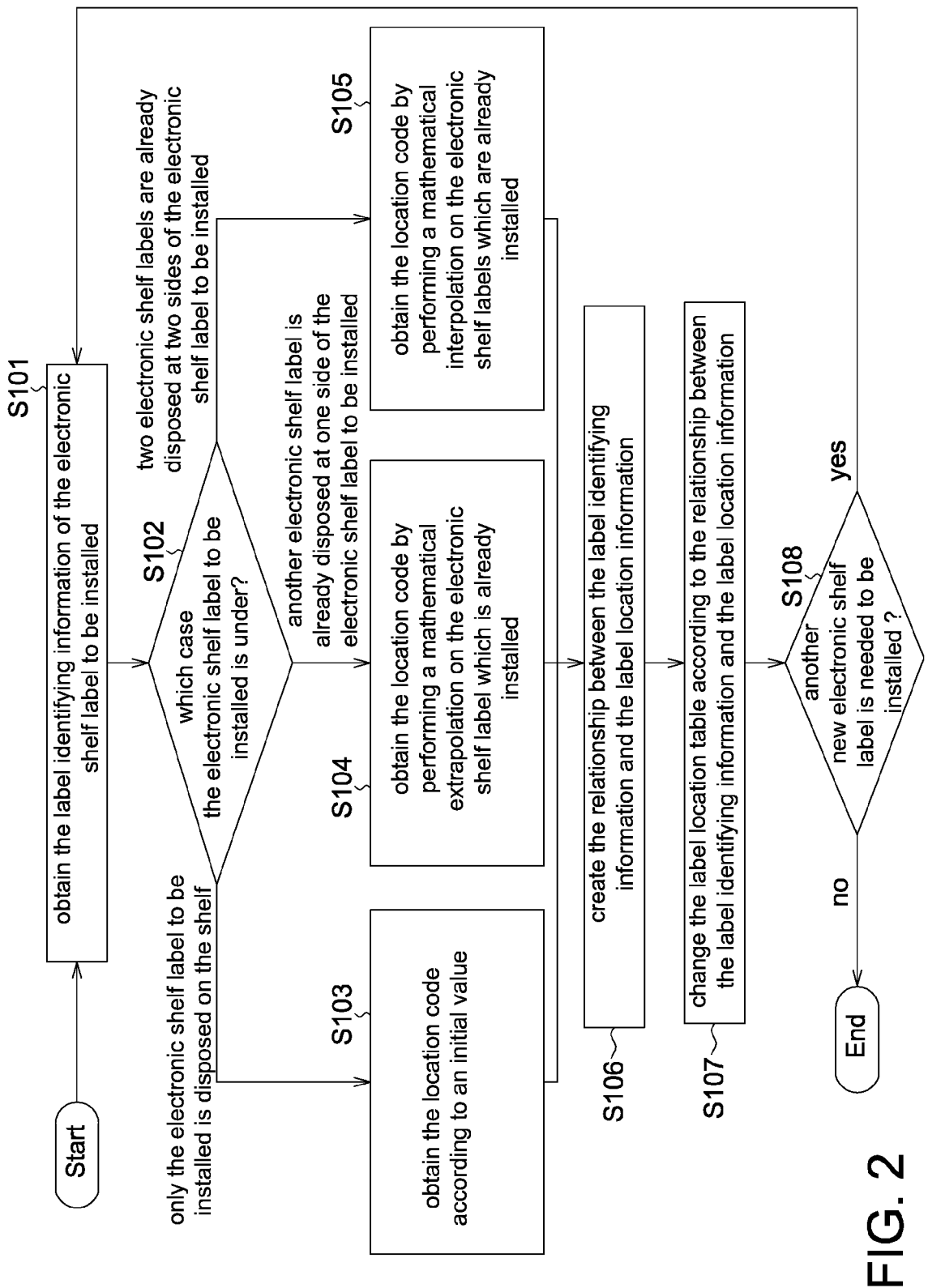
FIG. 2 illustrates a flowchart of an electronic shelf label installing method.

Please referring to FIG. 2, a flowchart of an electronic shelf label installing method is illustrated. In the installation of this electronic shelf label 110, there are three cases: In a first case, there is no electronic shelf label on the shelf 901 before installing the electronic shelf label 110 to be installed, i.e. only the electronic shelf label 110 to be installed is disposed on the shelf 901 after installing the electronic shelf label 110 to be installed. In a second case, another electronic shelf label is already disposed at one side of the electronic shelf label 110 to be installed and there is no electronic shelf label disposed at another side of the electronic shelf label 110 to be installed after installing the electronic shelf label 110 to be installed. In a third case, two electronic shelf labels are already disposed at two sides of the electronic shelf label 110 to be installed after installing the electronic shelf label 110 to be installed. The steps under those three cases are different.

In step S101, the deploying device 130 obtains the label identifying information of the electronic shelf label 110 to be installed.

In step S102, which case the electronic shelf label 110 to be installed is under is determined. If only the electronic shelf label 110 to be installed is disposed on the shelf 901 after installing the electronic shelf label 110 to be installed, then the process proceeds to step S103; if another electronic shelf label is already disposed at one side of the electronic shelf label 110 to be installed and there is no electronic shelf label disposed at another side of the electronic shelf label 110 to be installed after installing the electronic shelf label 110 to be installed, then the process proceeds to step S104; if two electronic shelf labels are already disposed at two sides of the electronic shelf label 110 to be installed after installing the electronic shelf label 110 to be installed, then the process proceeds to step S105.

In steps S103, S104 and S105, the deploying device 130 or the controlling device 120 creates the label location information of the electronic shelf label 110 to be installed. In step S103, the location code is obtained according to an initial value. The shelf code of the shelf 901 and the location code of the electronic shelf label 110 are combined to be the label location information. In step S104, the location code is obtained by performing a mathematical extrapolation on the electronic shelf label which is already installed. The shelf code of the electronic shelf label which is already installed and the location code are combined to be the label location information. In step S105, the location code is obtained by performing a mathematical interpolation on the electronic shelf labels which are already installed. The shelf codes of the electronic shelf labels which are already installed and the location code are combined to be the label location information.

In step S106, the deploying device 130 or the controlling device 120 creates the relationship between the label identifying information and the label location information.

In step S107, the controlling device 120 changes the label location table 121 according to the relationship between the label identifying information and the label location information.

In step S108, whether another new electronic shelf label is needed to be installed is determined. If another new electronic shelf label is needed to be installed, the process proceeds to S101; if no electronic shelf label is needed to be installed, the process is terminated.

If the electronic shelf label controlling system 100 adopts the first architecture, then the steps S103 to S106 can be performed by the controlling device 120. If the electronic shelf label controlling system 100 adopts the second architecture, then the steps S103 to S106 can be performed by the deploying device 130.

Figure 3A:
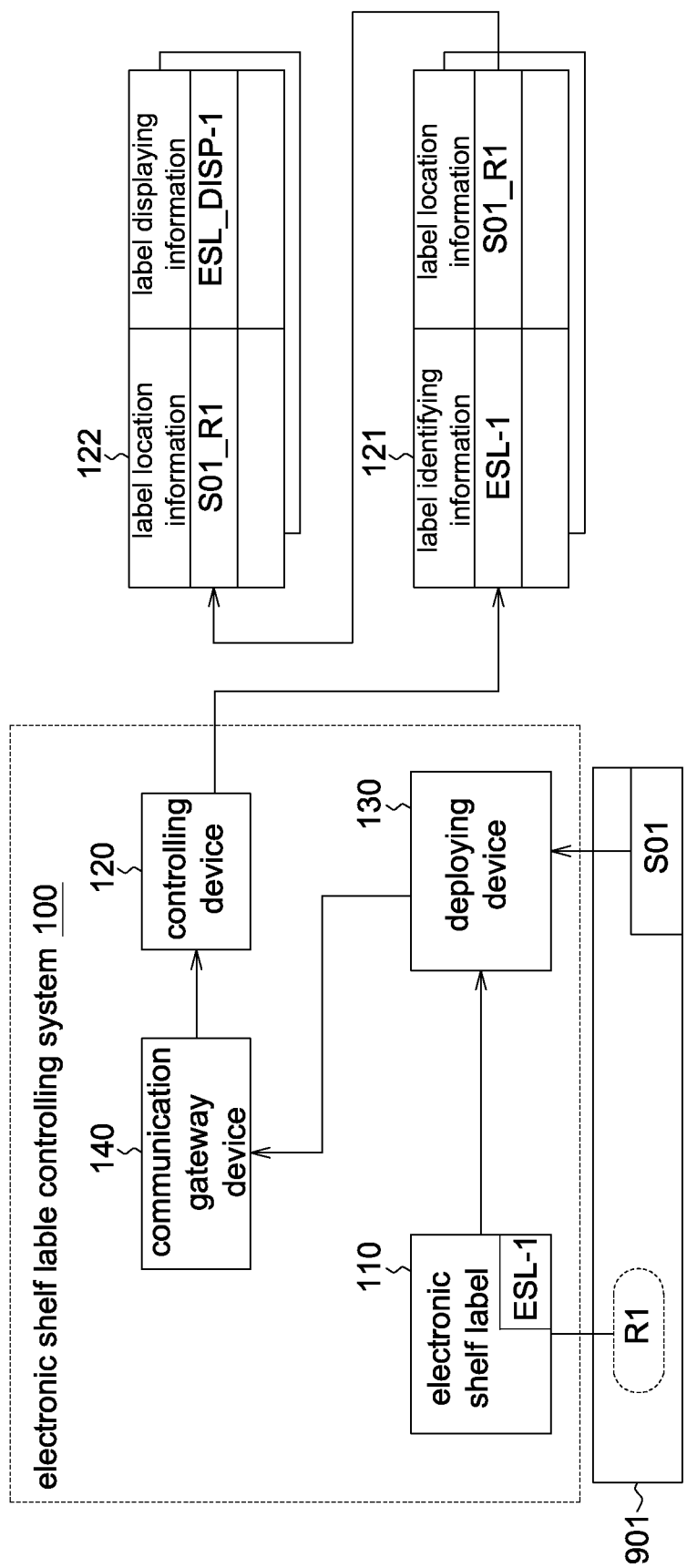
FIG. 3A shows an example of the electronic shelf label controlling system under a first case.

Please referring to FIG. 3A, an example of the electronic shelf label controlling system 100 under the first case is shown. Regarding the shelf code of the electronic shelf label 110 to be installed, the shelf code, such as "S01" can be obtained from the shelf 901, since there is no other electronic shelf label. Regarding the location code of the electronic shelf label 110 to be installed, the location code can be any initial value, such as "R1", since there is no other electronic shelf label.

Figure 3B:
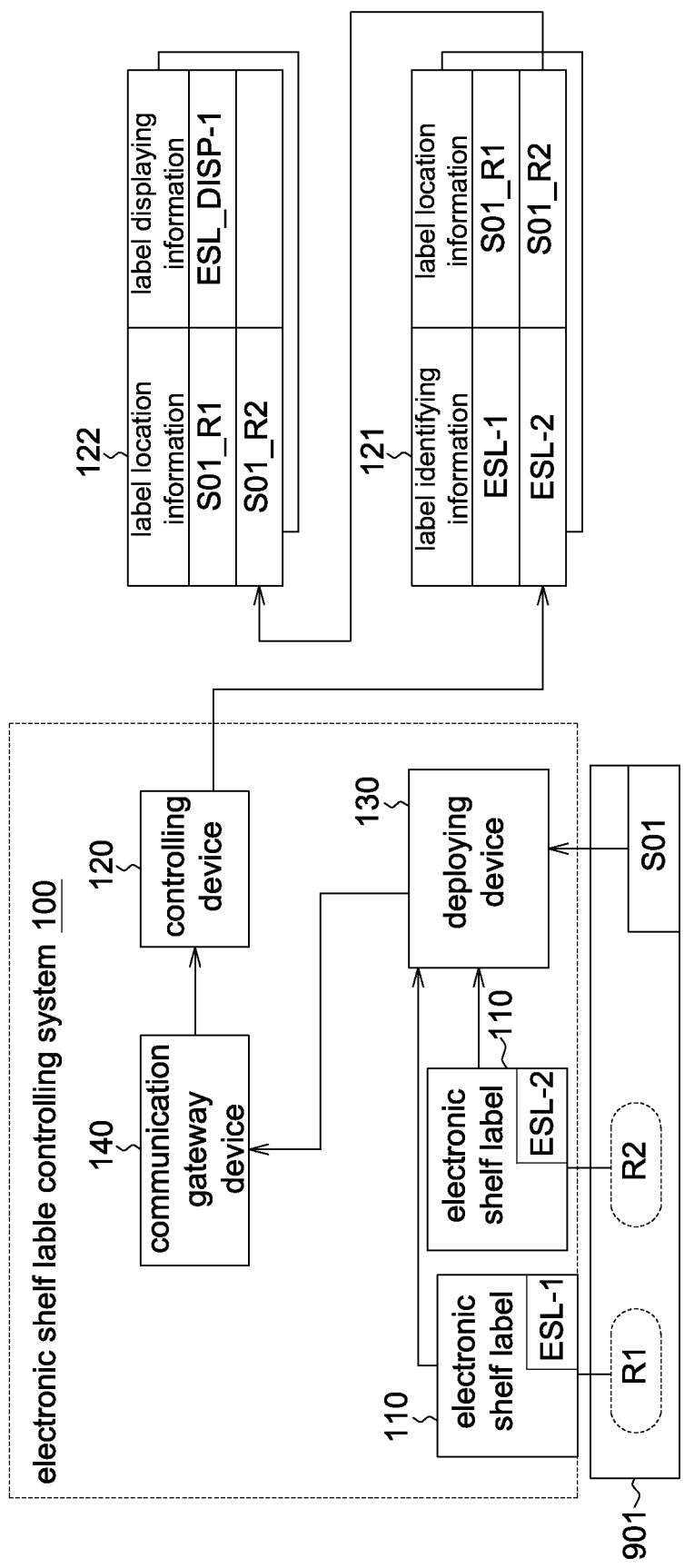
FIG. 3B shows an example of the electronic shelf label controlling system under a second case.

Please referring to FIG. 3B, an example of the electronic shelf label controlling system 100 under the second case is shown. On the shelf 901, from left to right, the first electronic shelf label 110 whose label identifying information is "ESL-1" is already installed, the second electronic shelf label 110 whose label identifying information is "ESL-2" is to be installed. Regarding the shelf code of the electronic shelf label 110 to be installed, there is another electronic shelf label 110 located at the left side of the electronic shelf label 110 to be installed. The shelf code of the label location information of the electronic shelf label 110 which is already installed is "S01." The shelf code of the electronic shelf label 110 to be installed can be set as "S01." Regarding to the location code of the electronic shelf label 110 to be installed, there is another electronic shelf label 110 which located at the left side of the electronic shelf label 110 to be installed. The location code of the label location information of the electronic shelf label 110 which is already installed is "R1." The location code of the electronic shelf label 110 to be installed can be "R2" by adding 1 to "R1." That is to say, the location code of the electronic shelf label 110 to be installed can be obtained by performing a mathematical extrapolation, such as addition or multiplication on the electronic shelf label 110 which is already installed, such that the location codes are incremented from left to right. In other embodiment, the location codes can be decremented from left to right.

Figure 3C:
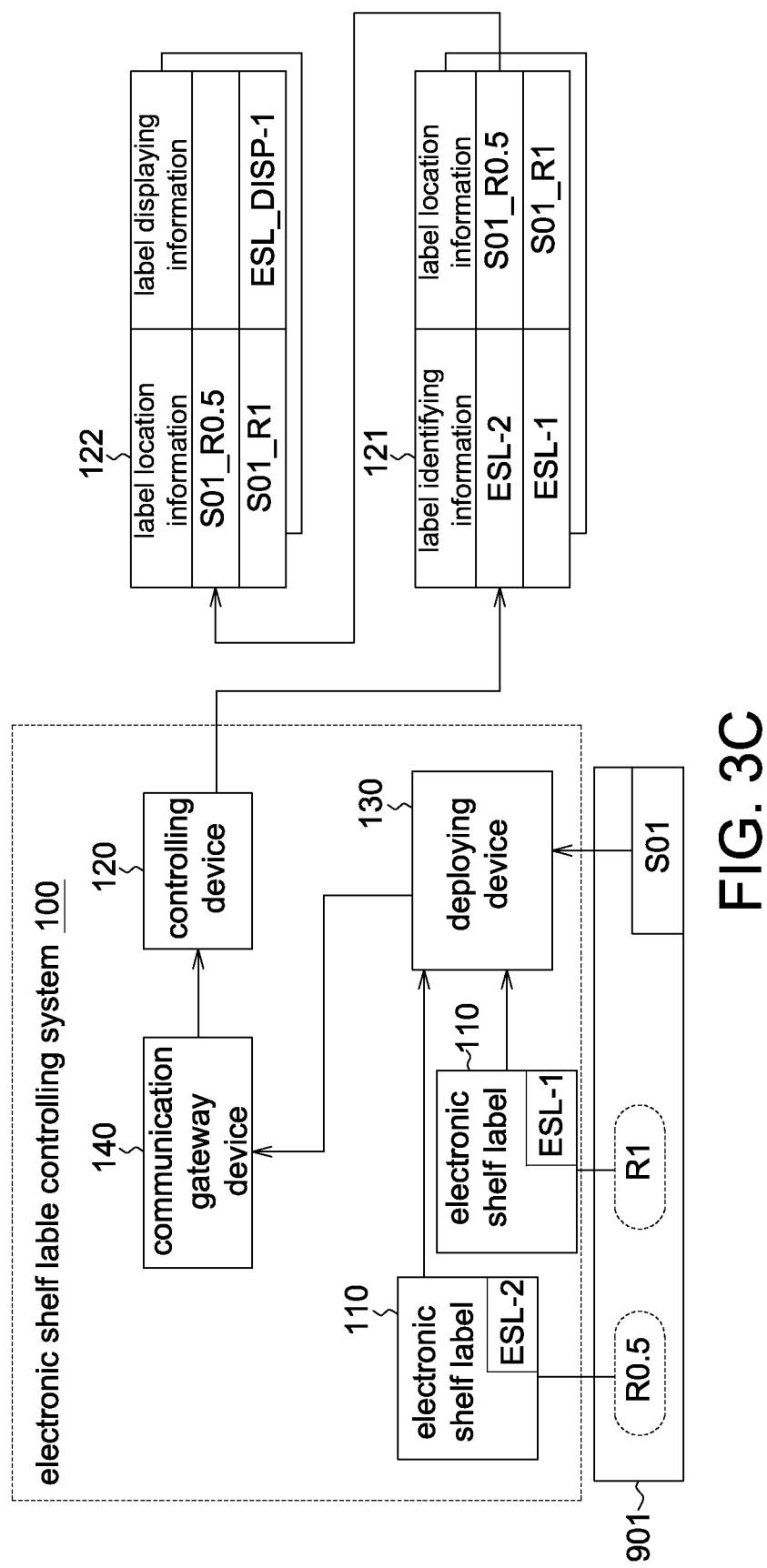
FIG. 3C shows another example of the electronic shelf label controlling system under the second case.

Please referring to FIG. 3C, another example of the electronic shelf label controlling system 100 under the second case is shown. From left to right, the first electronic shelf label 110 whose label identifying information is "ESL-2" is to be installed, and the second electronic shelf label 110 whose label identifying information is "ESL-1" is already installed. Regarding to the shelf code of the electronic shelf label 110 to be installed, there is another electronic shelf label 110 located at the right side of the electronic shelf label 110 to be installed. The shelf code of the label location information of the electronic shelf label 110 which is already installed is "S01." The shelf code of the electronic shelf label 110 to be installed can be set as "S01." Regarding to the location code of the electronic shelf label 110 to be installed, there is another electronic shelf label 110 which is located at the right side of the electronic shelf label 110 to be installed. The location code of the label location information of the electronic shelf label 110 which is already installed is "R1." The location code of the electronic shelf label 110 to be installed can be "R0.5" by dividing the number of "R1" by 2. In this case, the number of "R1" is 1. That is to say, the location code of the electronic shelf label 110 to be installed can be obtained by performing a mathematical extrapolation, such as subtraction or division on the electronic shelf label 110 which is already installed, such that the location codes are incremented from left to right.

Figure 3D:
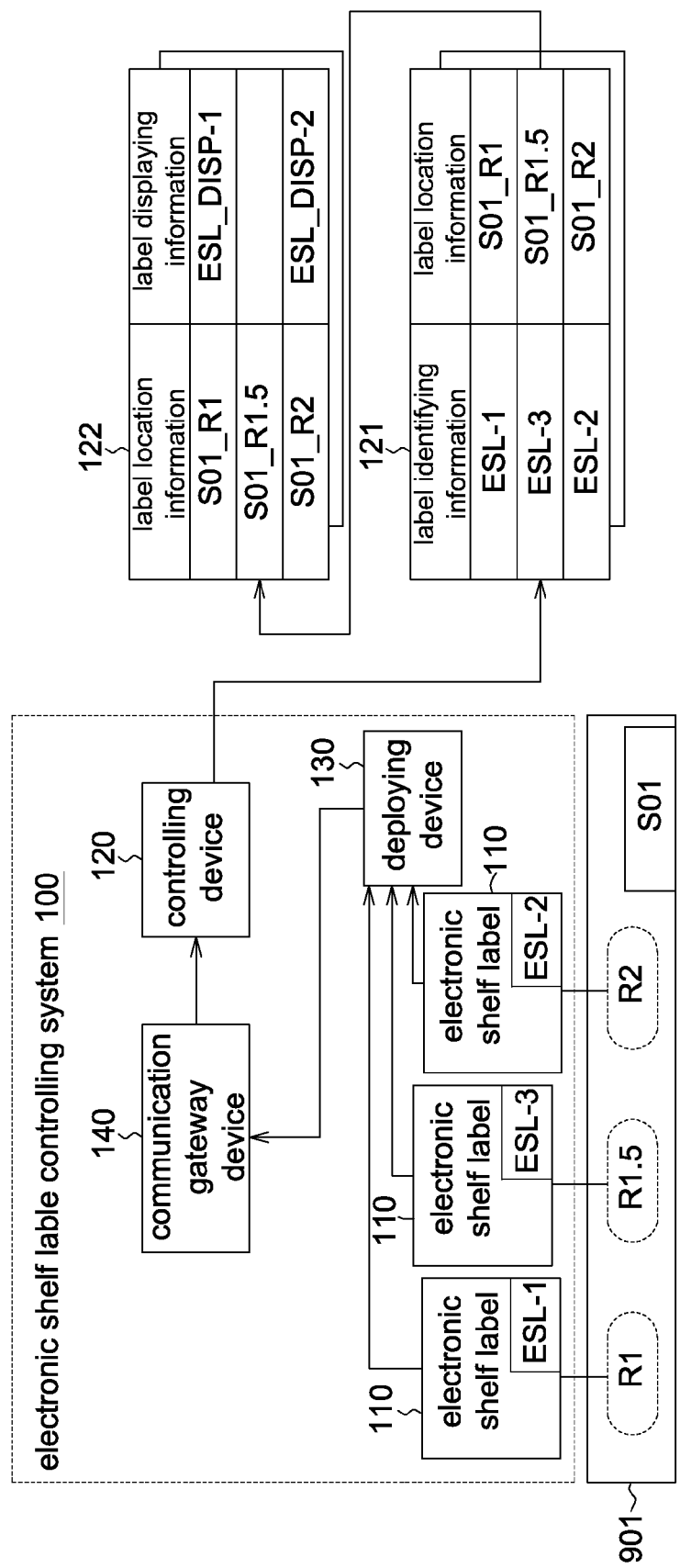
FIG. 3D shows an example of the electronic shelf label controlling system under a third case.

Please referring to FIG. 3D, an example of the electronic shelf label controlling system 100 under the third case is shown. From left to right, the first and third electronic shelf labels 110 whose label identifying information are "ESL-1" and "ESL-2" respectively are already installed, and the second electronic shelf label 110 whose label identifying information is "ESL-3" is to be installed. Regarding to the shelf code of the electronic shelf label 110 to be installed, there are two other electronic shelf labels 110 located at the left and right sides of the electronic shelf label 110 to be installed. The shelf codes of the label location information of the electronic shelf labels 110 which are already installed are "S01." The shelf code of the electronic shelf label 110 to be installed can be set as "S01." Regarding to the location code of the electronic shelf label 110 to be installed, the location code of the electronic shelf label 110 located at the left side of the electronic shelf label 110 to be installed is "R1", and the location code of the electronic shelf label 110 located at the right side of the electronic shelf label 110 to be installed is "R2." The location code of the electronic shelf label 110 to be installed can be "R1.5" by dividing the sum of the number of "R1" and "R2" by 2, such that the location code of the electronic shelf label 110 to be installed is between those two location codes. That is to say, the location code of the electronic shelf label 110 to be installed can be obtained by performing a mathematical interpolation, such that the location codes are incremented from left to right.

Figure 4A:
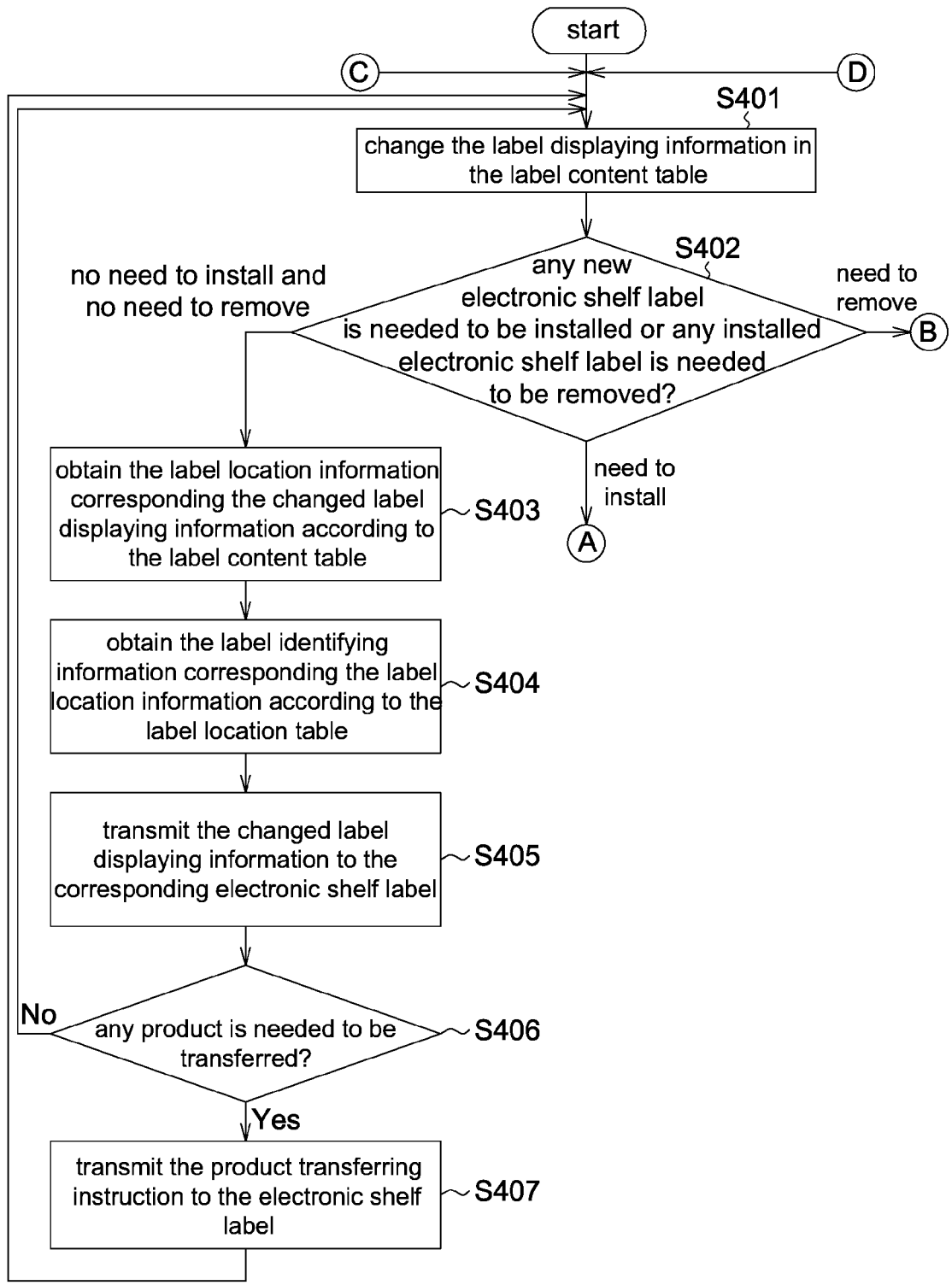
FIGS. 4A to 4C illustrate a flowchart of an electronic shelf label updating method.
Figure 4B:
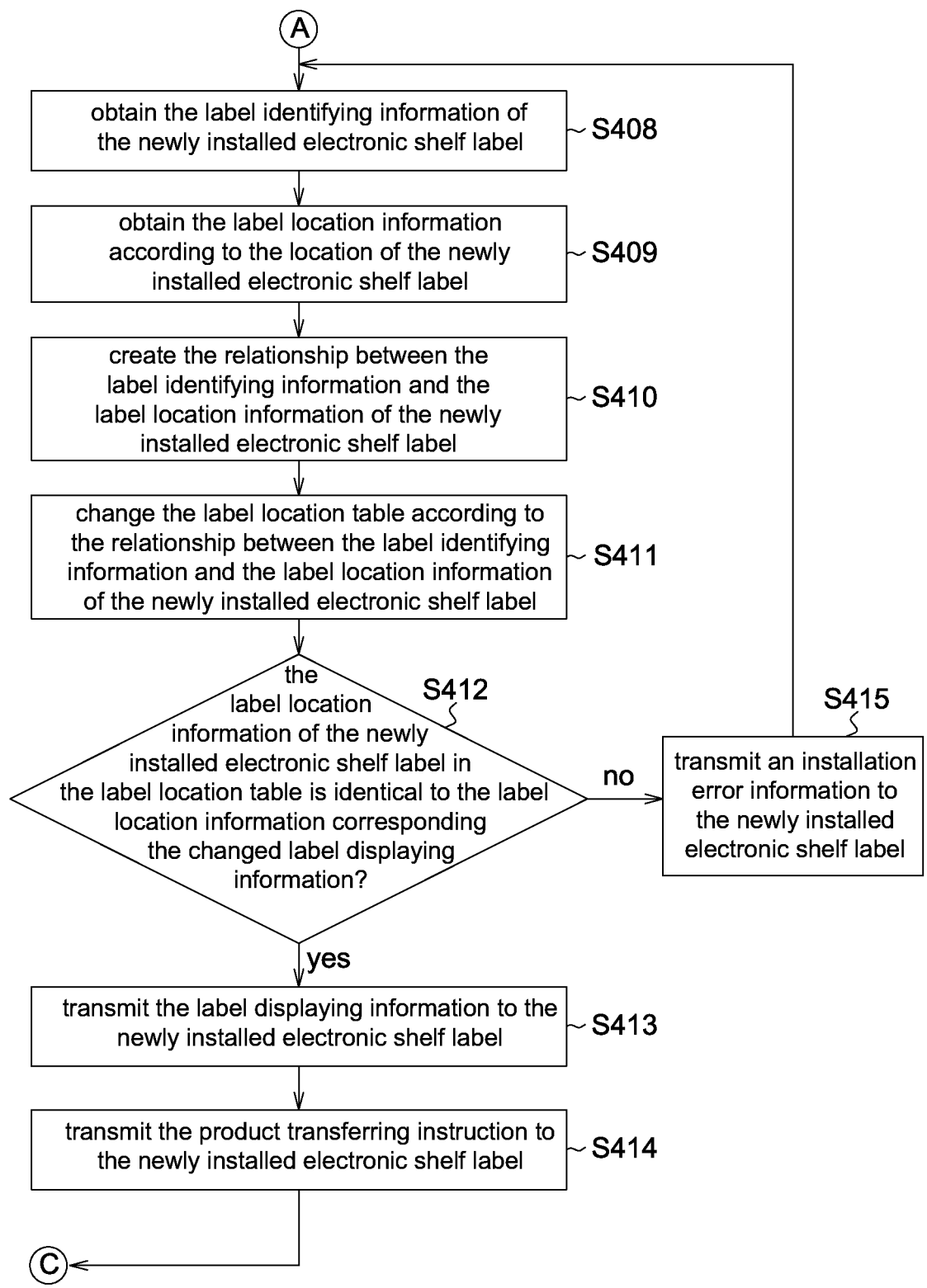
Figure 4C:
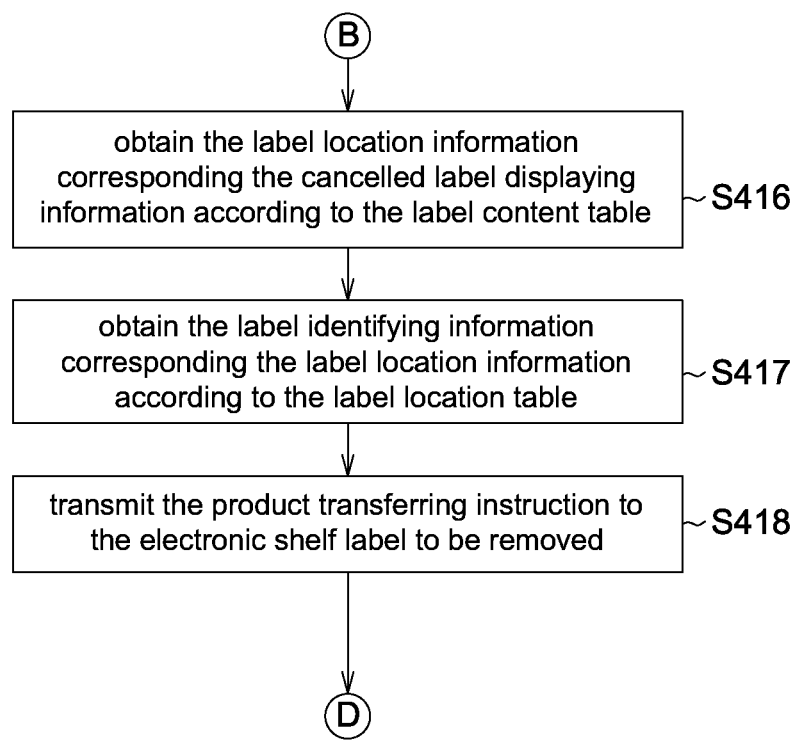

Please referring to FIGS. 4A to 4C, a flowchart of an electronic shelf label updating method is illustrated. The electronic shelf label updating method is performed under the following actions: First, the label displaying information is changed. Second, at least one product is transferred without installing any new electronic shelf label 110 and without removing any electronic shelf label 110. Third, at least one product is transferred and at least one electronic shelf label 110 is needed to be installed. Fourth, at least one product is transferred and at least one electronic shelf label 110 is needed to be removed.

The first action is performed by steps S401 to S406 in FIGS. 4A to 4C. The second action is performed by steps S401 to S407 in FIGS. 4A to 4C. The third action is performed by step S401, S402 and S408 to S415 in FIGS. 4A to 4C. The fourth action is performed by steps S401, S402, S416 to S418 in FIGS. 4A to 4C.

Figure 5A:
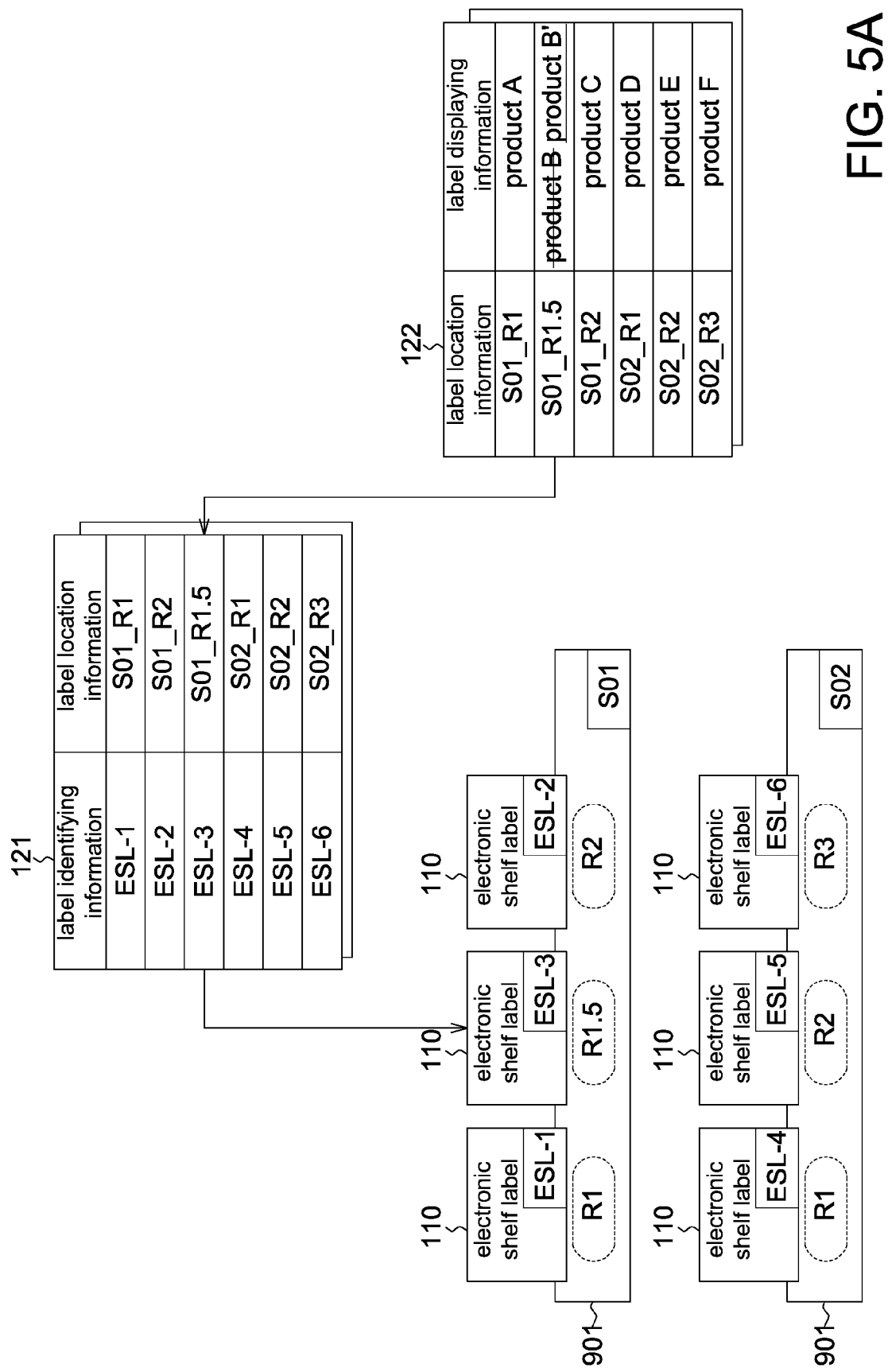
FIG. 5A shows an example of the electronic shelf label updating method performing a first action.

Please referring to FIGS. 4A to 4C and 5A. FIG. 5A shows an example of the electronic shelf label updating method performing the first action. In step S401, the label displaying information in the label content table 122 is changed. For example, "product B" is changed to be "product B'." The name of the product does not changed. Instead, the price may be changed or a promotion information may be added. In FIG. 5A, the strikethrough means that the wordings have been cancelled, and the underscore means that the wordings are newly added.

In step S402, whether any new electronic shelf label 110 is needed to be installed or any installed electronic shelf label 110 is needed to be removed is determined according to the changes of the label content table 122. If no new electronic shelf label 110 is needed to be installed and no installed electronic shelf label 110 is needed to be removed, then the process proceeds to step S403. If at least one new electronic shelf label 110 is needed to be installed, then the process proceeds to step S408. If at least one installed electronic shelf label 110 is needed to be removed, then the process proceeds to step S416. In FIG. 5A, "product B" is changed to be "product B'." No new electronic shelf label 110 is needed to be installed and no installed electronic shelf label 110 is needed to be removed, the process proceeds to step S403.

In step S403, the label location information, such as "S01_R1.5", corresponding to the changed label displaying information, such as "product B'", is obtained according to the label content table 122.

In step S404, the label identifying information, such as "ESL-3", corresponding to the label location information, such as "S01_R1.5", is obtained according to the label location table 121.

In step S405, the changed label displaying information, such as "product B'", is transmitted to the corresponding electronic shelf label 110, such as "ESL-3."

In step S406, whether any product is needed to be transferred is determined. If at least one product is needed to be transferred, then the process proceeds to step S407. If no product is needed to be transferred, then the process proceeds to step S401. In FIG. 5A, the name of the product in the label displaying information is not changed, so any product is not needed to be transferred and the process proceeds to step S401.

Please referring to FIGS. 4A to 4C and 5B, FIG. 5B shows an example of the electronic shelf label updating method performing the second action. In step S401, the label displaying information in the label content table 122 is changed. For example, "product B" is changed to be "product G" and "product F" is changed to be "product B." In FIG. 5B, the strikethrough means that the wordings have been cancelled, and the underscore means that the wordings are newly added. That is to say, the product B is transferred to the location where the product F is located, the product G is placed on the location where the product B is originally located, and the product F is removed.

Figure 5B:
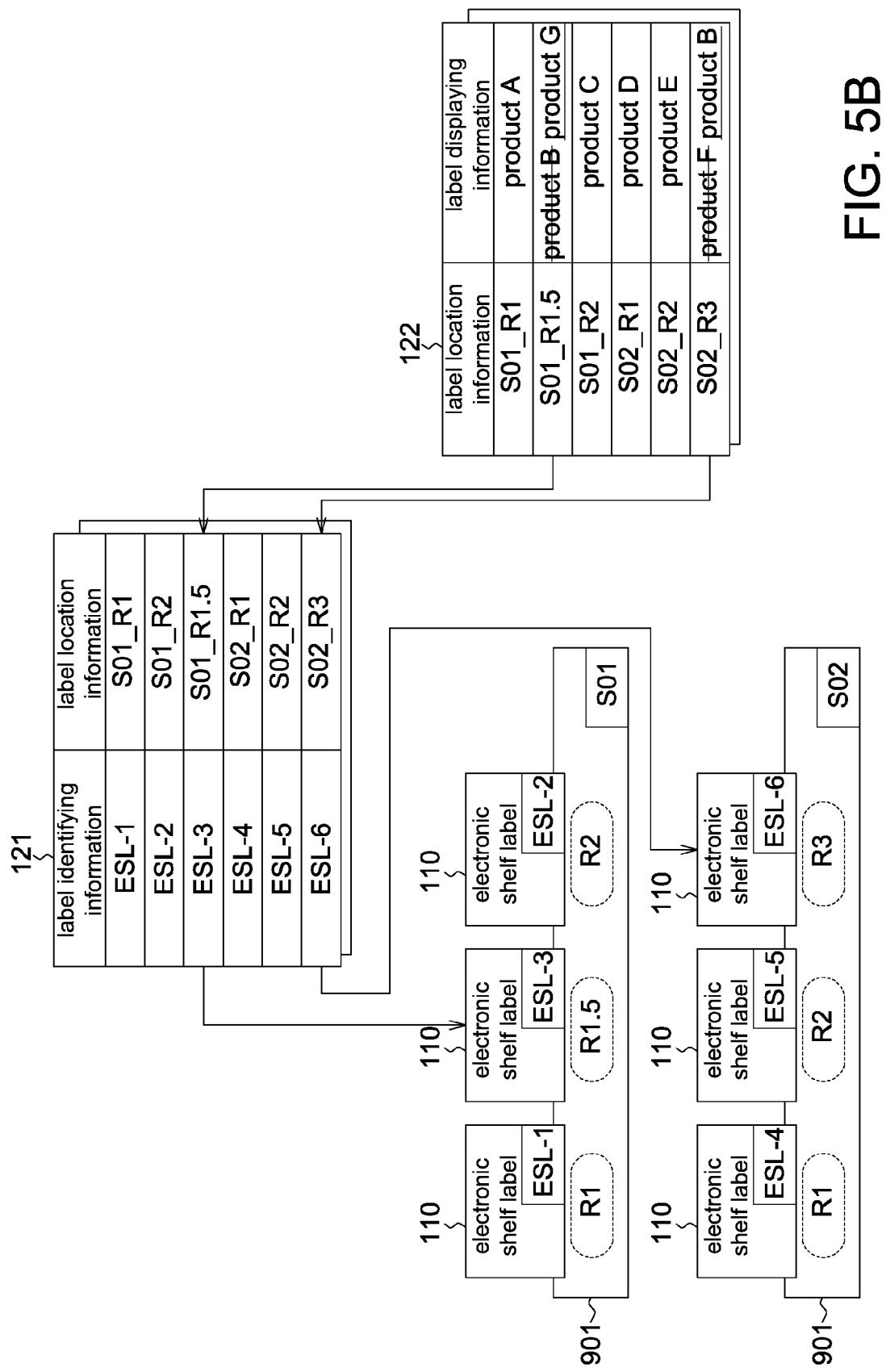
FIG. 5B shows an example of the electronic shelf label updating method performing a second action.

In step S402, whether any new electronic shelf label 110 is needed to be installed or any installed electronic shelf label 110 is needed to be removed is determined according to the changes of the label content table 122. If no new electronic shelf label 110 is needed to be installed and no installed electronic shelf label 110 is needed to be removed, then the process proceeds to S403. If at least one new electronic shelf label 110 is needed to be installed, then the process proceeds to step S408. If at least one installed electronic shelf label 110 is needed to be removed, then the process proceeds to step S416. In FIG. 5B, "product B" is changed to be "product G" and "product F" is changed to be "product B." No new electronic shelf label 110 is needed to be installed and no installed electronic shelf label 110 is needed to be removed, the process proceeds to step S403.

In step S403, the label location information, such as "S01_R1.5" and "S02_R3", corresponding to the changed label displaying information, such as "product G" and "product B", is obtained according to the label content table 122.

In step S404, the label identifying information, such as "ESL-3" and "ESL-6", corresponding to the label location information, such as "S01_R1.5" and "S02_R3", is obtained according to the label location table 121.

In step S405, the changed label displaying information, such as "product G" and "product B", is transmitted to the corresponding electronic shelf labels 110, such as "ESL-3" and "ESL-6."

In step S406, whether any product is needed to be transferred is determined. If at least one product is needed to be transferred, then the process proceeds to step S407. If no product is needed to be transferred, then the process proceeds to step S401. In FIG. 5B, "product B" is changed to be "product G" and "product F" is changed to be "product B", so some products are needed to be transferred and the process proceeds to step S407.

In step S407, the product transferring instruction, such as "remove the product B and place the product G" and "remove the product F and place the product B" is transmitted to the electronic shelf labels 110, such as "ESL-3" and "ESL-6."

Please referring to FIGS. 4A to 4C and 5C, FIG. 5C shows an example of the electronic shelf label updating method performing the third action. In step S401, the label displaying information in the label content table 122 is changed. For example, "product G" is inserted to be between "product D" and "product E." In FIG. 5C, the underscore means that the wordings are newly added. That is to say, one row is added into the label content table 122, and the label displaying information "product G" and the label location information "S02_R1.5" is added.

Figure 5C:
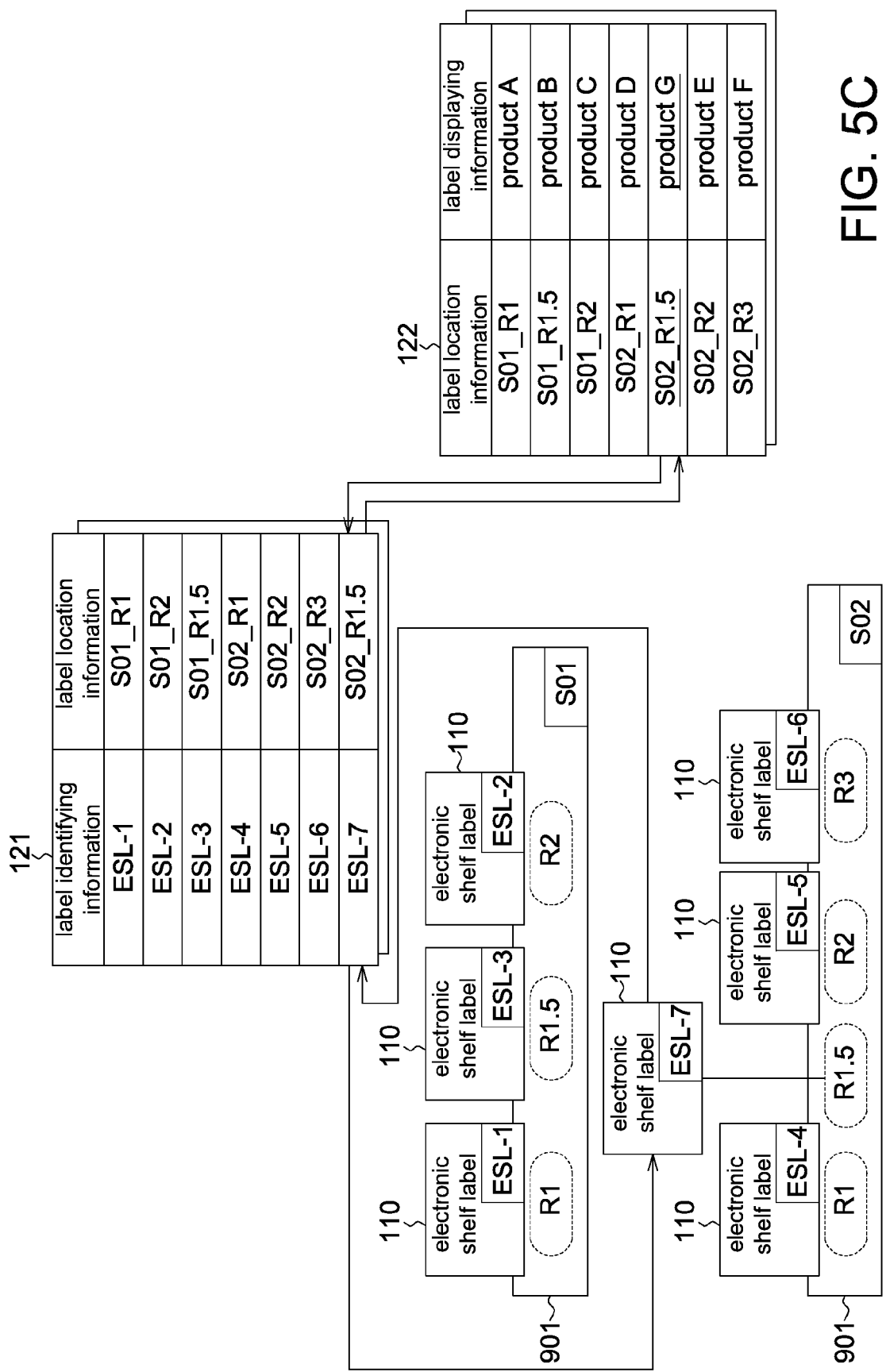
FIG. 5C shows an example of the electronic shelf label updating method performing a third action.

In step S402, whether any new electronic shelf label 110 is needed to be installed or any installed electronic shelf label 110 is needed to be removed is determined according to the changes of the label content table 122. If no new electronic shelf label 110 is needed to be installed and no installed electronic shelf label 110 is needed to be removed, then the process proceeds to S403. If at least one new electronic shelf label 110 is needed to be installed, then the process proceeds to step S408. If at least one installed electronic shelf label 110 is needed to be removed, then the process proceeds to step S416. In FIG. 5C, the label displaying information "product G" is newly added, so a new electronic shelf label 110 is needed to be installed and the process proceeds to step S408.

In step S408, after the manager disposes a new electronic shelf label 110 on the shelf 901, such as the second electronic shelf label 110 on the lower shelf 901, the label identifying information, such as "ESL-7", of the newly installed electronic shelf label 110 is obtained.

In step S409, the label location information, such as "S02_R1.5" is obtained according to the location of the newly installed electronic shelf label 110 on the shelf 901.

In step S410, the relationship between the label identifying information, such as "ESL-7", and the label location information, such as "S02_R1", of the newly installed electronic shelf label 110 are created.

In step S411, the label location table 121 is changed according to the relationship between the label identifying information, such as "ESL-7" and the label location information, such as "S02_R1.5", of the newly installed electronic shelf label 110.

In step S412, whether the label location information, such as "S02_R1.5", of the newly installed electronic shelf label 110 in the label location table 121 is identical to the label location information, such as "S02_R1.5", corresponding to the changed label displaying information, such as "product G", in the label content table 122 is determined.

If the label location information, such as "S02_R1.5" in the label location table 121 is identical to the label location information, such as "S02_R1.5", corresponding to the changed label displaying information, such as "product G", in the label content table 122, then the process proceeds to step S413. If the label location information, such as "S02_R1.5", in the label location table 121 is not identical to the label location information, such as "S02_R1.5", corresponding to the changed label displaying information, such as "product G", in the label content table 122, then the process proceeds to S415.

In step S413, the label displaying information, such as "product G" is transmitted to the newly installed electronic shelf label 110.

In step S414, the product transferring instruction, such as "place product G" is transmitted to the newly installed electronic shelf label 110.

Figure 5D:
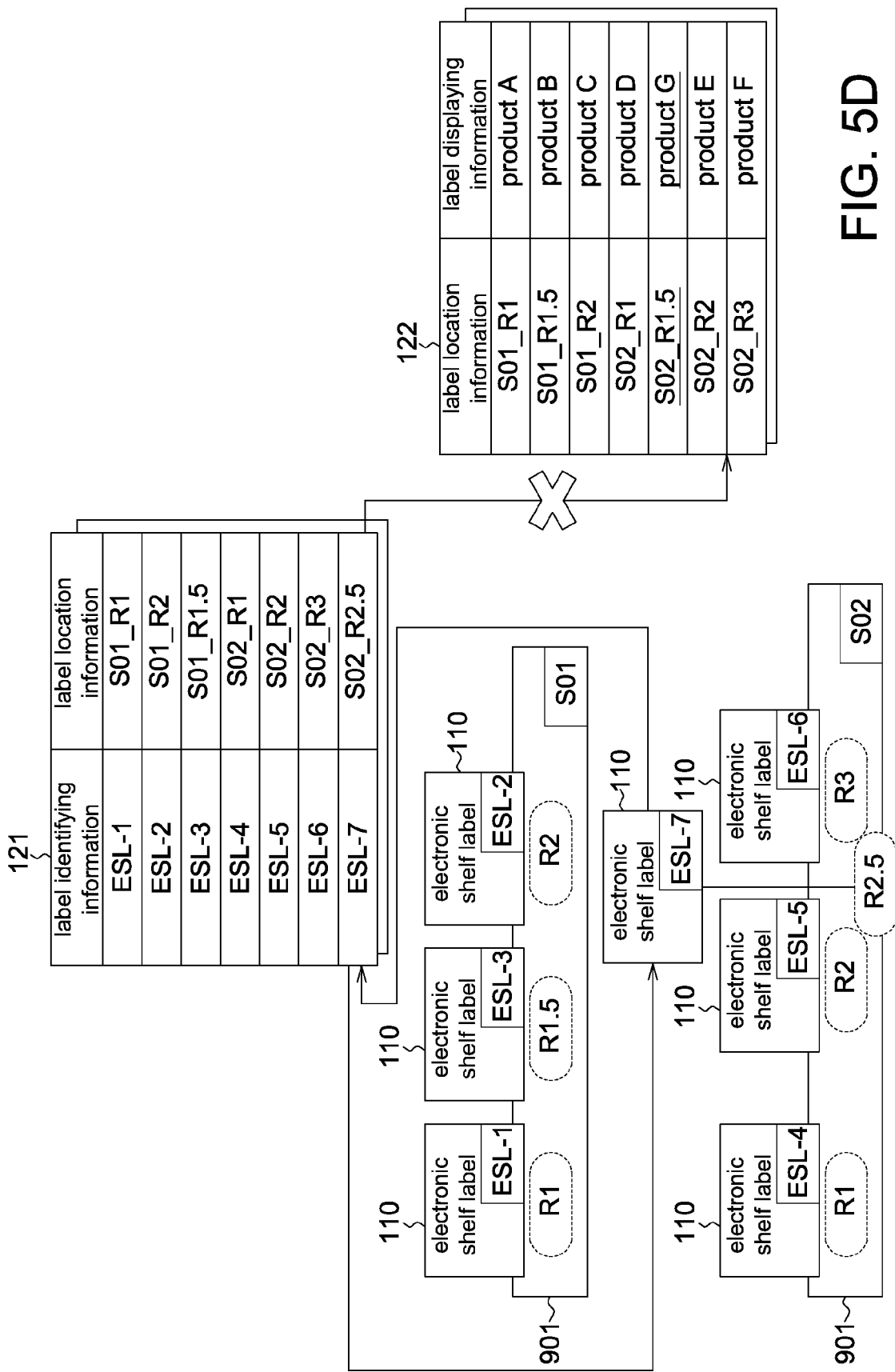
FIG. 5D shows another example of the electronic shelf label updating method performing the third action.

Please referring to FIGS. 4A to 4C and 5D, FIG. 5D shows another example of the electronic shelf label updating method performing the third action. In FIG. 5D. when the process proceeds to step S412, whether the label location information of the newly installed electronic shelf label 110 in the label location table 121 is identical to the label location information corresponding to the changed label displaying information in the label content table 122 is determined.

Referring to FIG. 5D, since the label location information, such as "S02_R2.5" in the label location table 121 is not identical to the label location information, such as "S02_R1.5", corresponding to the label displaying information, such as "product G", in the label content table 122, so the process proceeds to step S415.

In step S415, an installation error information, such as "Location error! Please try again!," is transmitted to the newly installed electronic shelf label 110.

Figure 5E:
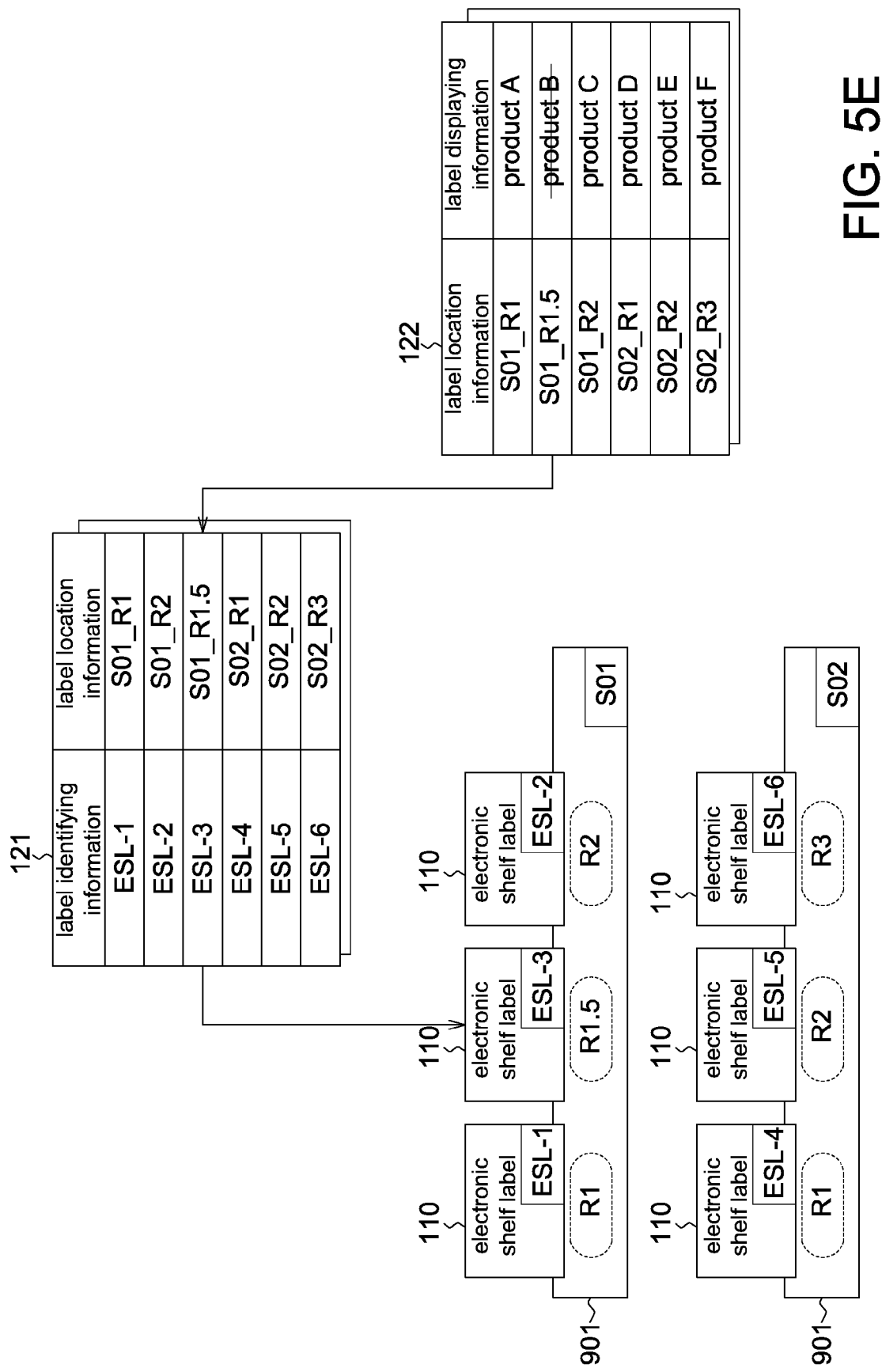
FIG. 5E shows an example of the electronic shelf label updating method performing a fourth action.

Please referring to FIGS. 4A to 4C and 5E, FIG. 5E shows an example of the electronic shelf label updating method performing the fourth action. In step S401, the label displaying information in the label content table 122 is changed. For example, "product B" is removed. In FIG. 5E, the strikethrough means that the wordings have been cancelled. That is to say, the product B is removed from the shelf. In one embodiment, if one row of the label displaying information in the label content table 122 is cancelled, the corresponding electronic shelf label 110 is needed to be removed and the corresponding row of the label content table 122 is needed to be removed.

In step S402, whether any new electronic shelf label 110 is needed to be installed or any installed electronic shelf label 110 is needed to be removed is determined according to the changes of the label content table 122. If no new electronic shelf label 110 is needed to be installed and no installed electronic shelf label 110 is needed to be removed, the process proceeds to S403. If at least one new electronic shelf label 110 is needed to be installed, the process proceeds to step S408. If at least one installed electronic shelf label 110 is needed to be removed, the process proceeds to step S416. In FIG. 5E, "product B" is cancelled, so the corresponding electronic shelf label 110 is needed to be removed and the process proceeds to step S416.

In step S416, the label location information, such as "S01_R1.5", corresponding to the cancelled label displaying information, such as product B" is obtained according to the label content table 122.

In step S417, the label identifying information, such as "ESL-3", corresponding to the label location information, such as "S01_R1.5", is obtained according to the label location table 121.

In step S418, the product transferring instruction, such as "remove product B" is transmitted to the electronic shelf label 110 to be removed.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An electronic shelf label controlling system, comprising:
   a first electronic shelf label disposed on a shelf;
   a controlling device storing a label location table, the label location table recording a relationship between a label identifying information and a label location information of the first electronic shelf label;
   a deploying device used for obtaining the label identifying information; and
   a communication gateway device used for communicating between the controlling device, the deploying device and the first electronic shelf label;
   wherein the controlling device further obtains a location code of the first electronic shelf label by performing a mathematical interpolation on a second electronic shelf label and a third electronic shelf label if the second electronic shelf label and the third electronic shelf label are disposed at two sides of the first electronic shelf label, the location code of the first electronic shelf label is between a location code of the second electronic shelf label and a location code of the third electronic shelf label, and a shelf code of the second electronic shelf label and the location code of the first electronic shelf label are combined to be the label location information.

2. The electronic shelf label controlling system according to claim 1, wherein the relationship between the label identifying information and the label location information is created by the controlling device.

3. The electronic shelf label controlling system according to claim 1, wherein the relationship between the label identifying information and the label location information is created by the deploying device.

4. The electronic shelf label controlling system according to claim 1, wherein the first electronic shelf label is used for displaying a label displaying information, the controlling device is further used for storing a label content table, and the label content table records a relationship between the label location information and the label displaying information.

5. An electronic shelf label installing method, comprising:
   obtaining a label identifying information of a first electronic shelf label;
   obtaining a label location information according to a location of the first electronic shelf label on a shelf;
   creating a relationship between the label identifying information and the label location information; and
   changing a label location table according to the relationship between the label identifying information and the label location information;
   wherein the step of obtaining the label location information includes:
   obtaining a location code of the first electronic shelf label by performing a mathematical interpolation on a second electronic shelf label and a third electronic shelf label if the second electronic shelf label and the third electronic shelf label are disposed at two sides of the first electronic shelf label, wherein the location code of the first electronic shelf label is between a location code of the second electronic shelf label and a location code of the third electronic shelf label, and a shelf code of the second electronic shelf label and the location code of the first electronic shelf label are combined to be the label location information.

6. The electronic shelf label installing method according to claim 5, wherein the step of obtaining the label location information includes:
   obtaining a location code according to an initial value if only the first electronic shelf label is disposed on the shelf, wherein a shelf code of the shelf and the location code of the first electronic shelf label are combined to be the label location information.

7. The electronic shelf label installing method according to claim 5, wherein the step of obtaining the label location information includes:
   obtaining the location code of the first electronic shelf label by performing a mathematical extrapolation on the second electronic shelf label if the second electronic shelf label is disposed at one side of the first electronic shelf label, wherein the location code of the first electronic shelf label and the location code of the second electronic shelf label are incremented or decremented, and the shelf code of the second electronic shelf label and the location code of the first electronic shelf label are combined to be the label location information.

8. An electronic shelf label updating method, wherein a label content table records a relationship between a first label location information and a first label displaying information of a first electronic shelf label, a label location table records a relationship between a first label identifying information and the first label location information of the first electronic shelf label, and the electronic shelf label updating method includes:
   changing the label content table by changing first label displaying information;
   looking up the changed label content table to know whether a second electronic shelf label is needed to be installed, or the first electronic shelf label is needed to be removed;
   obtaining the first label location information according to the changed label content table, if the second electronic shelf label is not needed to be installed and the first electronic shelf label is not needed to be removed;
   obtaining the first label identifying information corresponding to the first label location information according to the label location table;

transmitting the changed first label displaying information to the first electronic shelf label; and transmitting a product transferring instruction to the first electronic shelf label.

9. The electronic shelf label updating method according to claim 8, further comprising:

obtaining a second label identifying information of the second electronic shelf label, if the second electronic shelf label is needed to be installed;

obtaining a second label location information according to the location of the second electronic shelf label on a shelf;

creating a relationship between the second label identifying information and the second label location information;

changing the label location table according to the relationship between the second label identifying information and the second label location information;

determining whether the second label location information is identical to a third label location information corresponding to the second label displaying information in the label content table; and transmitting a second label displaying information which is added to the label content table to the second electronic shelf label, if the second label location information is identical to the third label location information corresponding to the second label displaying information in the label content table.

10. The electronic shelf label updating method according to claim 9, further comprising:

transmitting an error information to the second electronic shelf label, if the second label location information is not identical to the third label location information corresponding to the second label displaying information in the label content table.

11. The electronic shelf label updating method according to claim 9, further comprising:

transmitting the product transferring instruction to the second electronic shelf label.

12. The electronic shelf label updating method according to claim 8, further comprising:

obtaining the first label location information corresponding to the first label displaying information according to the label content table, if the first electronic shelf label is needed to be removed; and obtaining the first label identifying information corresponding to the first label location information according to the label location table.

* * * * *